(12) United States Patent
Dale

(10) Patent No.: US 7,444,237 B2
(45) Date of Patent: Oct. 28, 2008

(54) PLANNING A JOURNEY THAT INCLUDES WAYPOINTS

(75) Inventor: Jonathan Dale, San Francisco, CA (US)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 11/043,775

(22) Filed: Jan. 26, 2005

(65) Prior Publication Data

US 2006/0167621 A1 Jul. 27, 2006

(51) Int. Cl.
*G01C 21/00* (2006.01)

(52) U.S. Cl. ........................ 701/202; 342/455

(58) Field of Classification Search ............... 701/202, 701/200, 201, 207–209; 342/357.01, 357.13, 342/357.09, 454–456, 457; 340/988, 990
See application file for complete search history.

(56) References Cited

U.S. PATENT DOCUMENTS

| | | | | |
|---|---|---|---|---|
| 5,220,507 A * | 6/1993 | Kirson | | 701/202 |
| 5,459,666 A * | 10/1995 | Casper et al. | | 701/123 |
| 5,559,707 A * | 9/1996 | DeLorme et al. | | 701/200 |
| 5,819,201 A | 10/1998 | DeGraaf | | 701/208 |
| 6,278,938 B1 * | 8/2001 | Alumbaugh | | 701/208 |
| 6,356,822 B1 * | 3/2002 | Diaz et al. | | 701/33 |
| 6,427,118 B1 | 7/2002 | Suzuki | | 701/209 |
| 6,546,337 B2 | 4/2003 | Fish et al. | | 701/213 |
| 6,574,556 B2 | 6/2003 | Fish et al. | | 701/213 |
| 6,594,557 B1 | 7/2003 | Stefan et al. | | 701/1 |
| 6,763,300 B2 | 7/2004 | Jones | | 701/201 |
| 7,054,742 B2 * | 5/2006 | Khavakh et al. | | 701/209 |
| 7,062,379 B2 * | 6/2006 | Videtich | | 701/210 |
| 2002/0022923 A1 | 2/2002 | Hirabayashi et al. | | 701/200 |
| 2002/0073393 A1 * | 6/2002 | Campbell et al. | | 716/12 |
| 2003/0065442 A1 | 4/2003 | Touney | | 701/210 |
| 2004/0021583 A1 | 2/2004 | Lau et al. | | 340/995.19 |
| 2004/0128067 A1 | 7/2004 | Smith | | 701/207 |
| 2006/0089787 A1 * | 4/2006 | Burr et al. | | 701/202 |

OTHER PUBLICATIONS

"About Travel Information Systems, Ltd.", *Travel Information Expertise*, Travel InfoSystems, www.travelinfosystems.com, 6 pages, Printed Nov. 2004.

(Continued)

*Primary Examiner*—Dalena Tran
(74) *Attorney, Agent, or Firm*—Baker Botts L.L.P.

(57) ABSTRACT

Planning a journey from an origin to a destination involves establishing selection criteria that includes one or more journey parameters and one or more rules. A journey parameter describes a constraint of the journey, and a rule specifies an action to perform in response to a trigger event. A route for the journey from the origin to the destination is planned. A trigger event is detected after initiation of the journey. A rule specifying an action to perform in response to the detected trigger event is accessed. One or more alternate waypoints are selected in accordance with the action and the selection criteria. The one or more alternate waypoints are inserted into the route to create a next route.

26 Claims, 3 Drawing Sheets

OTHER PUBLICATIONS

"*Delivering data where you need it most,*" Yezerski Roper, © 2004 Yezerski Roper Ltd., http://www.yrl.co.uk/kawi/route_planning.html, 2 pages, Printed Nov. 2004.

"*Journey Planning,*" JourneyPlan making travel simple, © JourneyPlan Ltd., www.journeyplan.co.uk/products, 2 pages, Printed Nov. 2004.

"Public Transport Journey Planning", White Paper, opcom; www.opcom.com.au/pdf/iptis, IPTIS Copyright © 1993-2002, Opcom & The State of Queensland, 20 pages, Printed Nov. 2004.

"The multi-modal journey planner", *CityPlanner*, Travel InfoSystems, © Travel InfoSystems 2005, 3 pages, Printed Nov. 2004.

* cited by examiner

PLANNING A JOURNEY THAT INCLUDES WAYPOINTS

TECHNICAL FIELD

This invention relates generally to the field of journey planning and more specifically to planning a journey that includes waypoints.

BACKGROUND

Journey planning involves planning a route between an origin and a destination. The route may include waypoints between the origin and the destination. Existing techniques for journey involve planning a route that satisfies specified parameters. For example, the route may be planned to satisfy a starting time and an ending time. Most existing techniques, however, provide rigid offerings that do little to simplify or automate journey planning.

SUMMARY OF THE DISCLOSURE

In accordance with the present invention, disadvantages and problems associated with previous techniques for journey planning may be reduced or eliminated.

According to one embodiment of the invention, planning a journey from an origin to a destination involves establishing selection criteria that includes one or more journey parameters and one or more rules. A journey parameter describes a constraint of the journey, and a rule specifies an action to perform in response to a trigger event. A route for the journey from the origin to the destination is planned. A trigger event is detected after initiation of the journey. A rule specifying an action to perform in response to the detected trigger event is accessed. One or more alternate waypoints are selected in accordance with the action and the selection criteria. The one or more alternate waypoints are inserted into the route to create a next route.

Certain embodiments of the invention may provide one or more technical advantages. A technical advantage of one embodiment may be that an alternate waypoint may be automatically selected after a traveler has started a journey. The alternate waypoint may be suggested to the traveler. Another technical advantage of one embodiment may be that an alternate waypoint may be automatically inserted into the route of the journey. The waypoint may be automatically inserted if the traveler approves the suggestion. Another technical advantage may be that the waypoint may be selected in accordance with selection criteria and waypoint descriptions. A waypoint with a waypoint description that satisfies the selection criteria may be selected as the alternate waypoint.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
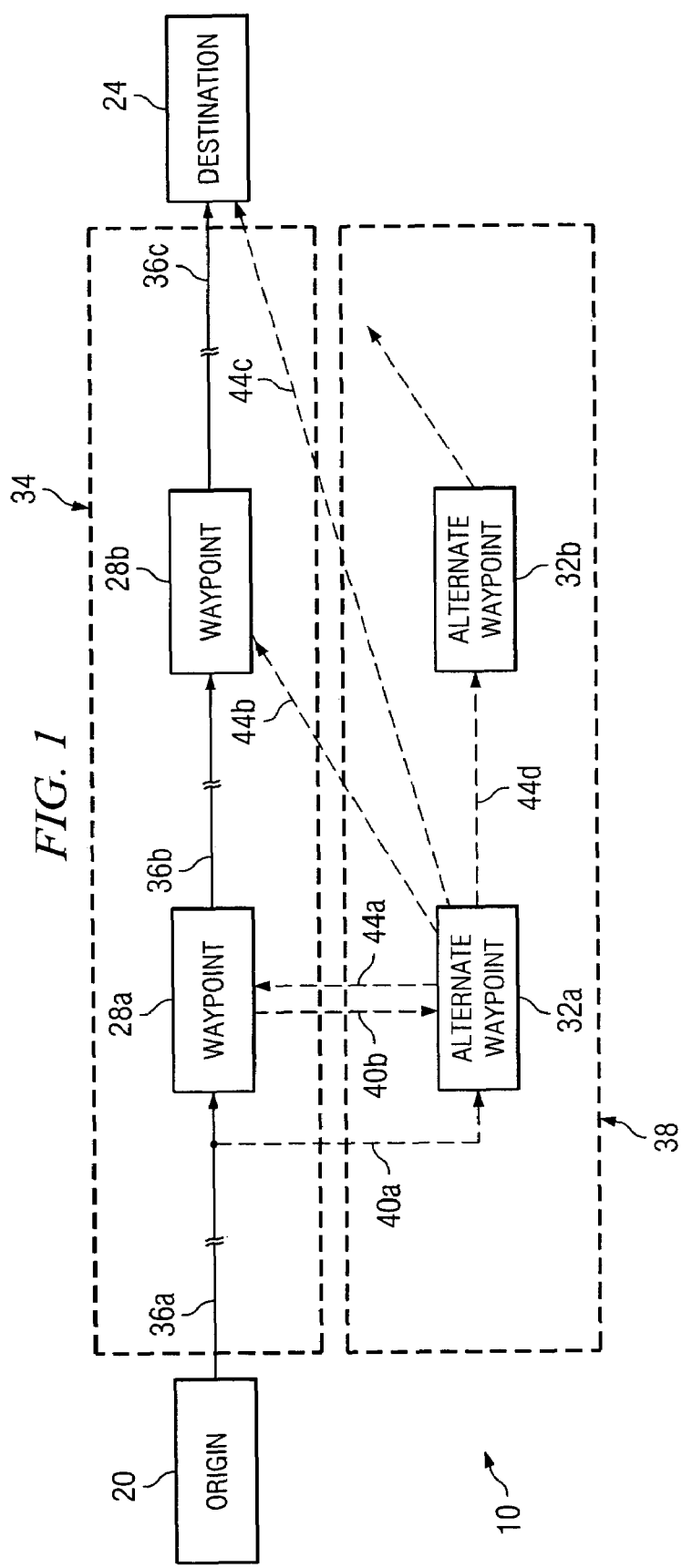
FIG. 1 is a diagram illustrating a journey that may be planned according to one embodiment of the invention.
Figure 2:
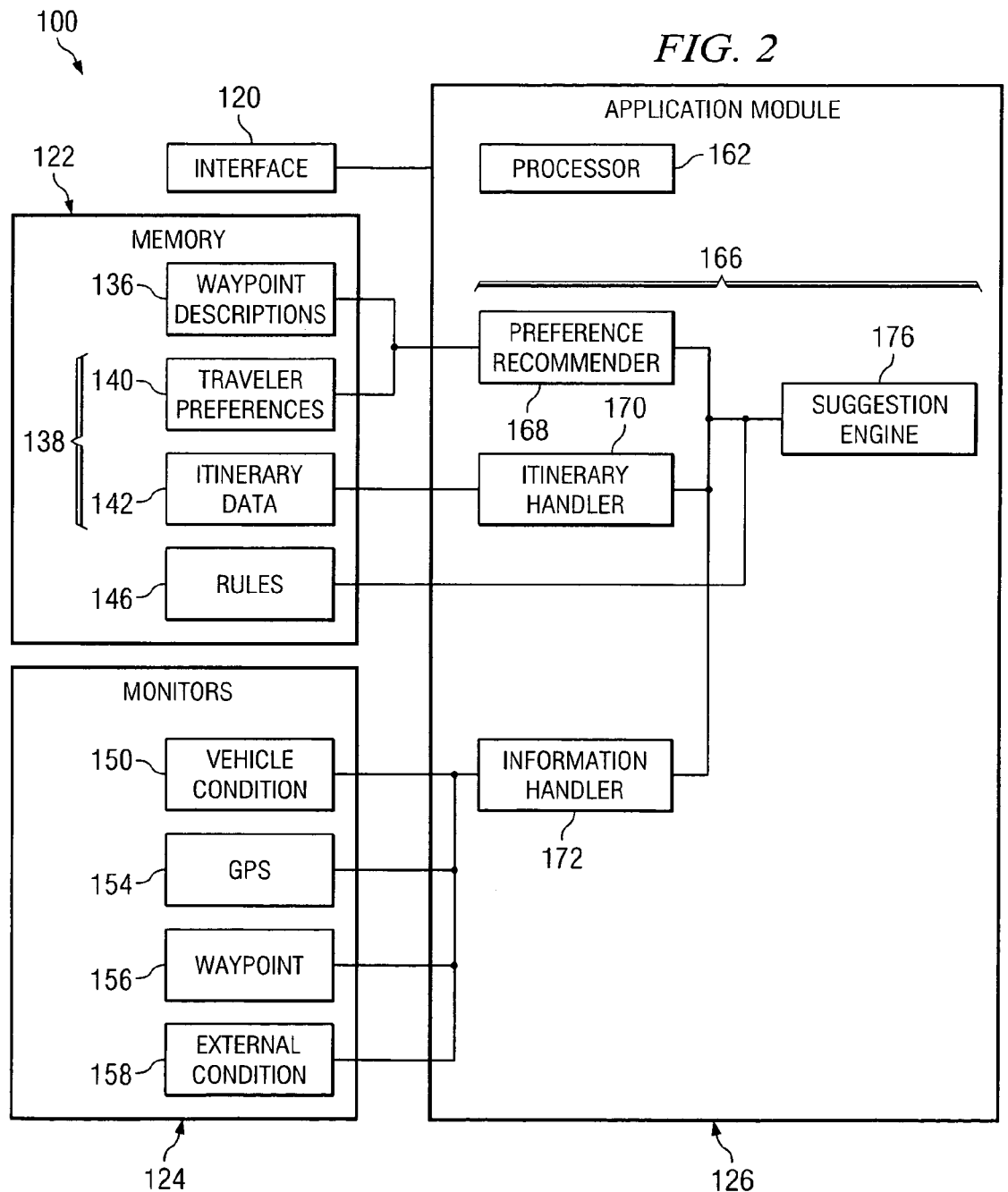
FIG. 2 is a block diagram illustrating one embodiment of a system that may be used to plan a journey according to one embodiment of the invention.
Figure 3:
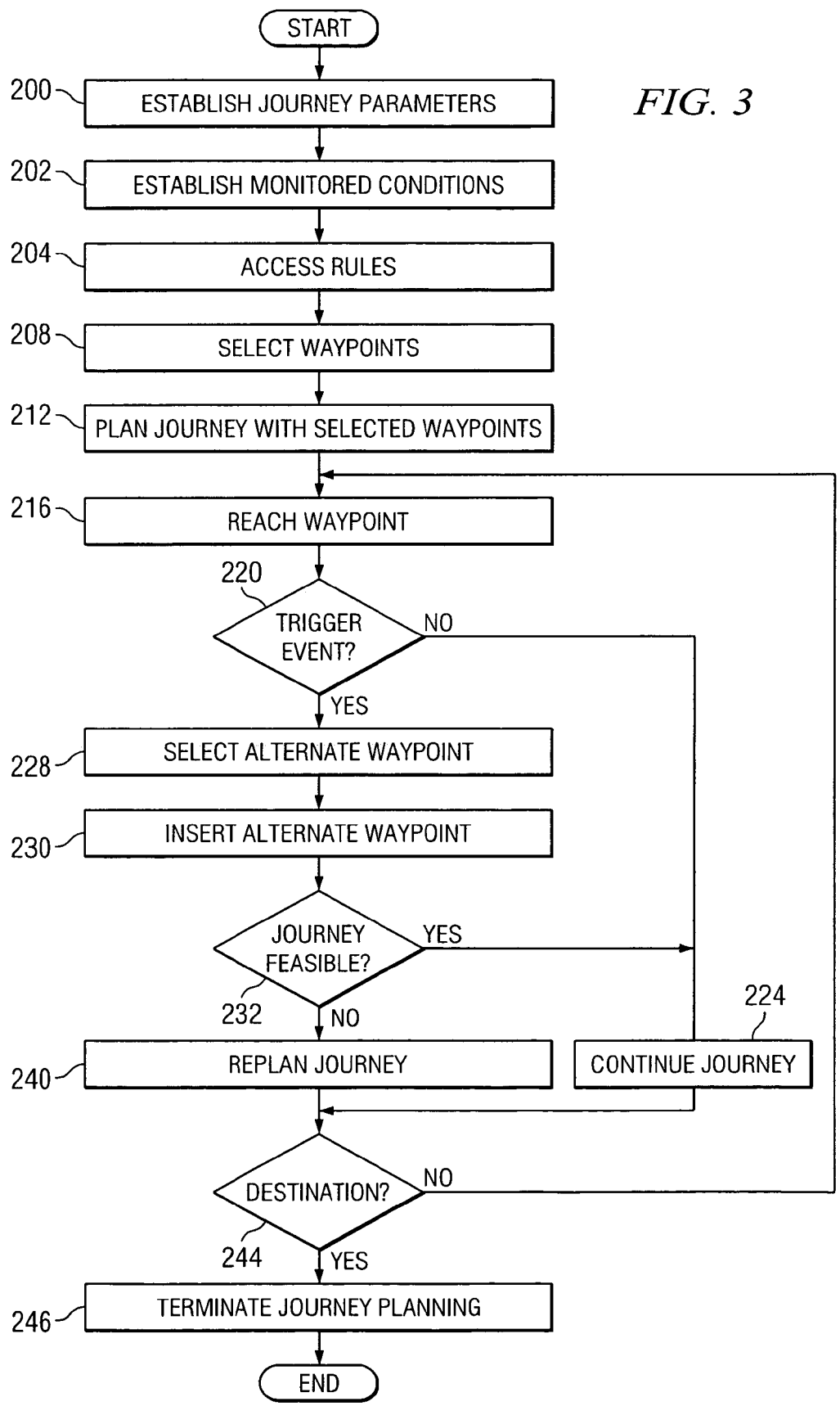
FIG. 3 is a flowchart illustrating one embodiment of a method that may be used to plan a journey according to one embodiment of the invention.

Embodiments of the present invention and its advantages are best understood by referring to FIGS. 1 through 3 of the drawings, like numerals being used for like and corresponding parts of the various drawings.

FIG. 1 is a diagram illustrating a journey 10 that may be planned according to one embodiment of the invention. According to the embodiment, a route between an origin and a destination of the journey may be planned for a traveler. After the journey has started, an alternate waypoint may be automatically selected and suggested to the traveler. The waypoint may be selected in accordance with selection criteria and waypoint descriptions. For example, a waypoint with a waypoint description that satisfies the selection criteria may be selected as the alternate waypoint. If the traveler approves the suggestion, the alternate waypoint may be automatically inserted into the route.

A journey may refer to a plurality of points and a route traveled by a traveler among the points. A traveler may refer to the entity traveling along the route of a journey. A traveler typically represents a human, but may represent a non-human object. As an example, a traveler may represent a computer or other object that can approve suggestions for alternate waypoints.

A point may refer to a location such as a geographical location. As an example, a point may represent an address, a building, a place of business, geographical coordinates, other location, or any combination of the preceding. A point may represent a location where a service is provided. For example, a point may represent an automobile service station, a restaurant, a hotel, an attraction, a store, a business, a company, other service location, or any combination of the preceding.

According to the illustrated embodiment, points include an origin 20, a destination 24, waypoints 28, and alternative waypoints 32 coupled as shown. Origin 20 represents the starting point of journey 10, and destination 24 represents the ending point of journey 10. Waypoints 28 represent intermediate points of journey 10 between origin 20 and destination 24. Alternate waypoints 32 represent waypoints suggested after the journey has started.

A point description provides information about a point, and a waypoint description provides information that allows for selection of a waypoint according to selection criteria. A point description may include a location description, a service description, other description, or any combination of the preceding. A location description may provide the geographical location of the point, which may be given by an address, global positioning system coordinates, other description of location, or any combination of the preceding. The location description may also provide a physical description of the point. The physical description may include a building description, a parking description, or other physical information about the point.

A service description may describe the type of service offered at the point. For example, a service description may describe whether the waypoint provides restaurant, automobile, hotel, retail, other service, or any combination of the preceding. The service description may also provide the time periods during which the service is offered, and may also indicate whether a reservation or an appointment is needed to obtain the service.

A route may refer to a path among the points. A route may comprise an initial route or an alternate route. An initial route refers to a route that is scheduled before or around the departure of the traveler from origin 20. An alternate route refers to a route that is proposed after the departure of the traveler from origin 20.

According to the illustrated embodiment, initial route 36 includes legs 36*a-c* that go from origin 20 to destination 24 through waypoints 28*a-b*. A leg may refer to a path from one point to a next point. Alternate routes 38 includes alternate waypoints 32*a-b* and alternate legs. A particular alternate route includes an outgoing leg 40 and a returning leg 44. An outgoing leg 40 may refer to a leg that goes from initial route 34 to alternate waypoint 32. Outgoing leg 40 may leave initial route 34 at any suitable part of initial route 34. As an example, outgoing leg 40*a* leaves initial route 34 at leg 36*a*, but outgoing leg 40*b* leaves initial route 34 at waypoint 28*a*.

A returning leg 44 may refer to a leg that returns to initial route 34 or goes to another alternate waypoint 32. As a first example, returning leg 44*a* returns to initial route 30 at waypoint 28*a* from which the preceding outgoing leg 40*b* left. As a second example, returning leg 44*b* returns to initial route 34 at a different waypoint 28*b*. As a third example, returning leg 44*c*, returns to initial route 34 at destination 24, skipping one or more waypoints 28*b*. As a fourth example, returning leg 44*d* travels to another alternate waypoint 32*b*. The journey may continue from alternate waypoint 32*b*.

According to one embodiment, alternate waypoint 32 may be automatically selected in accordance with selection criteria. According to the embodiment, waypoints with waypoint descriptions that satisfy selection criteria may be selected. Selection criteria may refer to criteria journey that may be used to select alternate waypoint 32, and may include parameters, monitored conditions, rules, or any combination of the preceding.

A journey parameter may refer to a value that remains generally constant during journey 10. Journey parameters may change in certain cases, but in general remain constant. A journey parameter may include a traveler preference, a route parameter, or a combination of both. A traveler preference describes a feature of a waypoint that the traveler would like to include in journey 10. For example, traveler preferences may describe a preferred chain of hotel, restaurant, service station, or other place of business. Traveler preferences may describe a preferred type of point, such a restaurant that serves a particular type of food, for example, Italian or Chinese food, or a restaurant with a specific average meal price.

A route parameter describes parameters of the route. According to one embodiment, route parameters may be obtained from an itinerary of the traveler. Route parameters may include a point parameter, a time parameter, or a combination of both. A point parameter describes a point of journey 10. For example, point parameters may specify origin 20 and destination 24 or required and optional waypoints 28.

A time parameter describes the time specifications of journey 10. For example, time parameters may include the maximum time allowed to travel from origin 20 to destination 24, the maximum time allowed to travel from one point to another point, the minimum or maximum amount of time to spend at a particular point, the time at which the traveler must arrive or leave a particular point, other suitable time parameter, or any combination of the preceding. A time parameter may also include a time variation within which the time parameter is permitted to vary.

Monitored conditions refer to conditions of journey 10 that may vary during journey 10. Monitored conditions may, of course, remain constant during journey 10, but typically may have a possibility of varying. Monitored conditions may include vehicle conditions, external conditions, or a combination of both.

Vehicle conditions describe conditions of the vehicle of the traveler that may affect travel along a route. A vehicle may refer to any suitable transporter for the traveler, such as an automobile, an airplane, or a motorcycle. The traveler, however, need not be traveling in any vehicle. According to one embodiment of the invention, vehicle conditions may describe the condition of an automobile. The conditions may describe whether the vehicle needs more fuel, requires servicing, or otherwise needs to vary from initial route 34.

External conditions describe conditions external to the vehicle that may affect travel along a route. For example, the conditions may describe the weather, traffic, or other condition that affects travel.

A journey rule specifies an action to perform in response to a particular trigger event. A trigger event may be detected through the monitored conditions. An action may involve selecting a waypoint, notifying the traveler of the selected waypoint, inserting the waypoint into a route, other action, or any combination of the preceding. A rule may be classified according to the type of trigger event. For example, a rule may be classified according whether the trigger event is based on a location, preference, time, situation, other trigger, or any combination of the preceding. A location-based rule is applied in response to a location, such as when the traveler is at a specific point or within a specific distance of a point. An example rule may specify that when a restaurant is reached, offer to provide parking directions.

A preference-based rule is applied if a preference matches a condition. An example rule may specify that if the traveler is approaching a restaurant that matches the traveler preferences, notify the traveler of the restaurant. A time-based rule is applied in response to a certain time. A time may be given as an objective time, such as a specific time of day, or as a relative time, such as the elapsed time from leaving a point. An example rule may specify that if the time is 9:00 a.m., begin navigating the traveler to the next point.

A situation-based rule is applied in response to a specific condition. An example rule may specify that if the fuel level of vehicle falls below a threshold value, search for a nearby gas station, notify the traveler, offer to provide navigational instructions to the gas station, or any combination of the preceding. Another example rule may specify that if the tire pressure of a vehicle tire drops below a threshold value, search for a gas station with a tire pump facility, alert the traveler, offer to provide navigational instructions to the gas station, or any combination of the preceding. Another example rule may specify that if the mileage reaches a threshold value indicating that service is needed, search for a service center, alert the traveler, offer to provide navigational instructions to the traveler, or any combination of the preceding. These rules may be programmed into the vehicle by, for example, the manufacturer of the vehicle.

Selection criteria may be categorized into particular contexts. As an example, traveler preferences may be categorized into different contexts. For example, traveler preferences may be categorized into a business context and a personal context. Traveler preferences that deal with business trips may be placed in the business context, and preferences relating to personal travel may be placed in the personal context. The journey parameters may specify the context of journey 10.

According to one embodiment, alternate waypoints 32 may be automatically inserted into journey 10. As an example, an alternate waypoint 32 may be suggested to the traveler. In response to an approval of the suggestion, the waypoint may be automatically inserted into journey 10. As another example, an alternate waypoint 32 may be automatically inserted without approval from the traveler.

Modifications, additions, or omissions may be made to journey 10 without departing from the scope of the invention. For example, journey 10 may include more or fewer points configured in any suitable matter. Moreover, the routes among the points may be configured in any suitable matter. As used in this document, "each" refers to each member of a set or each member of a subset of a set.

FIG. 2 is a block diagram illustrating one embodiment of a system that may be used to plan a journey according to one embodiment of the invention. According to the illustrated embodiment, system 100 includes an interface 120, a memory 122, an application module 126, and external modules 124 coupled as shown.

According to one embodiment, interface 120 allows a user such as a traveler to communicate with application module 126 to plan a journey. Interface 120 may include any hardware, software, other logic, or combination of the preceding for communicating with application module 126, and may use any of a variety of computing structures, arrangements, or compilations to communicate with application module 126.

Memory 122 may include any hardware, software, other logic, or combination of the preceding for storing and facilitating retrieval of information. Also, memory 122 may use any of a variety of data structures, arrangements, and compilations to store and facilitate retrieval of information. Memory 122 may include Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

According to the illustrated embodiment, memory 122 stores waypoint descriptions 136, journey parameters 138 such as traveler preferences 140 and itinerary data 142, and rules 146. Waypoint descriptions 136 may be used to select waypoints that satisfy the selection criteria. Traveler preferences 140 describe preferences of the traveler. Itinerary data 142 stores the itinerary for the traveler. The data may be used to determine route parameters, and may be retrieved from a personal information manager or may be input manually by the user. As an example, itinerary data 142 may come from Personal Information Management (PIM) software. Rules 146 stores the rules that define actions to be taken in response to trigger events.

Monitors 124 provide information about conditions that may affect journey 10. The conditions may include vehicle conditions and external conditions. Monitors 124 include vehicle condition monitor 150, a Global Positioning System (GPS) 154, a waypoint monitor 156, and an external condition monitor 158 coupled as shown. Vehicle condition monitor 150 monitors the condition of the vehicle. The vehicle condition may include the amount of fuel, emergency indicators, tire pressure, other vehicle condition, or any combination of the preceding. Global Positioning System (GPS) 154 may be used to monitor the location of the vehicle and to determine the location of points.

Waypoint monitor 156 may search for and may monitor waypoints that provide services. For example, waypoint monitor 156 may use information from waypoint descriptions 136 and traveler preferences 140 to search for preferred waypoints. Waypoint monitor 156 may also monitor services provided by the waypoints. For example, waypoint monitor 156 may monitor reservations for the waypoints. If a waypoint changes a reservation, waypoint monitor 156 may inform the traveler and re-plan the journey. If the traveler changes a reservation for a waypoint, waypoint monitor 156 may inform the waypoint and re-plan the journey. External condition monitor 158 may be used to monitor external conditions. An external condition monitor 158 may include a traffic information service.

Application module 126 manages applications that plan a journey. Application module 126 may include any hardware, software, other logic, or combination of the preceding for managing the applications, and may use any of a variety of computing structures, arrangements, and compilations to manage the applications. According to the illustrated embodiment, application module 126 includes a processor 162 and engines 166 coupled as shown. "Processor" refers to any suitable device operable to execute instructions and manipulate data to perform operations.

According to the illustrated embodiment, engines 166 includes a preference recommender 168, an itinerary handler 170, an information handler 172, and a suggestion engine 176. Preference recommender 168 determines waypoints that may be preferred by the traveler. The preferred waypoints may be determined in any suitable manner. For example, the traveler may input preferred waypoints into preference recommender 168, which in turn provides the preferred waypoints to suggestion engine 176. As another example, preference recommender 168 may present waypoint options from which the traveler may select. Preference recommender 168 may provide the selected waypoints to suggestion engine 176.

As yet another example, preference recommender 168 compares waypoint descriptions 136 with traveler preferences 140 to determine the preferred waypoints. The comparison may be made in any suitable manner. According to one embodiment, waypoint descriptions 136 may use parameters to describe the waypoints. For example, a restaurant parameter may describe a type of restaurant. A particular waypoint may have specific parameter values for the parameters. For example, a particular waypoint may have a parameter value of "Italian restaurant" for the restaurant parameter. Traveler preferences 140 may include parameter values that describe the preferences of the traveler. Preference recommender 168 may compare waypoint descriptions 136 with traveler preferences 140 to determine one or more waypoints that have values that match or substantially match. Preference recommender 168 provides the preferred waypoints to suggestion engine 176.

Itinerary handler 170 provides an interface for itinerary data 142. Itinerary handler 170 receives itinerary data 142 and organizes data 142 to generate an itinerary for the traveler. The itinerary may be used to determine route parameters. Itinerary handler 170 may provide the itinerary to suggestion engine 176. Information handler 172 receives information from monitors 124 and processes the information for use by suggestion engine 176. As an example, information handler 172 may place information received from monitors 124 into a format that is recognized by suggestion engine 176.

Suggestion engine 176 detects a trigger event, and selects a waypoint in accordance with rules 146. The trigger event may be detected in response to information received from preference recommender 168, itinerary handler 170, or information handler 172. As an example, preference recommender 168 may indicate that the traveler has selected a waypoint to insert into or delete from the journey. As another example, service monitor 156 may indicate that the traveler is going to be late for an appointment, and that the journey should be re-planned. The waypoint may be selected in accordance with selection criteria. The selection criteria may be obtained from preferred waypoints received from preference recommender 168, route parameters determined from the itinerary from itinerary handler 170, condition information received from information handler 172, other information, or any combination of the preceding.

The selected waypoints may be prioritized according to the compatibility of the waypoints and the selection criteria. A waypoint that is more compatible may be given a higher priority than a waypoint that is less compatible. Metrics may be used to calculate the compatibility of the waypoints. The metrics may comprise, for example, a suitability metric measuring how well the waypoint matches the traveler preferences 140, a proximity metric measuring the distance between the waypoint and the traveler, other metric, or any combination of the preceding. A prioritization function may weight some metrics more than others.

Suggestion engine 176 inserts the alternate waypoint 32 into journey 10. As an example, an alternate waypoint 32 may be suggested to the traveler. Alternate waypoint 32 may be suggested through interface 120. Higher priority waypoints may be suggested before lower priority waypoints. The traveler may approve the suggestion through interface 120. In response to an approval of this suggestion, the waypoint may be automatically inserted into journey 10. As another example, alternate waypoint 32 may be automatically inserted without approval from the traveler. If no alternate waypoints 32 are available, the waypoint becomes invalid.

Suggestion engine 176 may also determine whether the rest of journey 10 is feasible with the alternate waypoint 32. A feasible journey may refer to a journey that includes valid waypoints and that does not violate selection criteria such as journey parameters. If the rest of journey 10 is not feasible then suggestion engine 176 may determine an alternate route 38. A method that may be used by suggestion engine 176 is described with reference to FIG. 3.

Interface 120, memory 122, application module 126, and monitors 124 may operate on one or more computers and may include appropriate input devices, output devices, mass storage media, processors, memory, or other components for receiving, processing, storing, and communicating information according to the operation of system 10. For example, the functions of interface 120, memory 122, application module 126, or any combination of the preceding may be provided using a single computer system, for example, a personal computer. As used in this document, the term "computer" refers to any suitable device operable to execute instructions and manipulate data to perform operations, for example, a personal computer, work station, network computer, wireless telephone, personal digital assistant, one or more microprocessors within these or other devices, or any other suitable processing device.

Interface 120, memory 122, application module 126, and monitors 124 may be integrated or separated according to particular needs. If any of interface 120, memory 122, application module 126, and monitors 124 are separated, the separated components may be coupled to each other using a local area network (LAN), a metropolitan area network (MAN), a wide area network (WAN), a global computer network such as the Internet, or any other appropriate wire line, wireless, or other link.

Modifications, additions, or omissions may be made to system 100 without departing from the scope of the invention. The components of system 100 may be integrated or separated according to particular needs. All or a portion of system 100 may be integrated as one or more independent devices, or may be integrated as a part of one or more other devices. For example, all or a portion of system 100 may be included as a component of a vehicle, a computer, a personal digital assistant, or other device.

Moreover, the operations of system 100 may be performed by more, fewer, or other modules. For example, the operations of preference recommender 168 and itinerary handler 170 may be performed by one module, or the operations of suggestion engine 176 may be performed by more than one module. Additionally, operations of system 100 may be performed using any suitable logic comprising software, hardware, other logic, or any suitable combination of the preceding.

FIG. 3 is a flowchart illustrating one embodiment of a method for planning a journey according to one embodiment of the invention. The method may be used with system 100 of FIG. 2. The method begins at step 200, where journey parameters are established. Journey parameters may include traveler preferences accessed from user data 140, and route parameters accessed from itinerary data 142. Monitored conditions are established at step 202. The monitored conditions may include vehicle conditions and external conditions, which may be obtained through monitors 124. Rules 146 are accessed at step 204. A rule may specify an action to be performed in response to a trigger event.

Waypoints 28 for initial route 34 are selected at step 208. Waypoints 28 may be selected in accordance with the journey parameters. Journey 10 is planned with the selected waypoints at step 212. Suggestion engine 176 may plan journey 10 by determining a route 34 through waypoints 28. A waypoint 28 is reached at step 216. Journey 10 may have time-based rules that specify when waypoint 28 should be reached. When a waypoint 28 is reached, a time condition may be reset.

A trigger event may occur at step 220. A trigger event may be location-based, situation-based, time-based, or preference-based. If a trigger event does not occur at step 220, the method proceeds to step 224, where the journey 10 continues as planned. If a trigger event occurs at step 220, the method proceeds to step 228, where an alternative waypoint 32 is selected. The alternative waypoint may be selected in accordance with journey parameters and monitored conditions. The alternate waypoint 32 is inserted into journey 10 at step 230. The alternate waypoint 32 may be inserted after approval from the traveler.

Journey 10 with alternate waypoint 32 may or may not be feasible at step 232. If journey 10 is feasible, the method proceeds to step 224, where journey 10 continues as planned. If journey 10 is not feasible, the method proceeds to step 240, where journey 10 is re-planned. Suggestion engine 176 may re-plan journey 10.

Destination 24 may be reached at step 244. If destination 24 is not reached, the method proceeds to step 216, where a next waypoint is reached. If destination 24 is reached at step 244, the method proceeds to step 246. Journey planning is terminated at step 246. After terminating journey planning, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an alternate waypoint may be automatically selected after a traveler has started a journey. The alternate waypoint may be suggested to the traveler. Another technical advantage of one embodiment may be that an alternate waypoint may be automatically inserted into the route of the journey. The waypoint may be automatically inserted if the traveler approves the suggestion. Another technical advantage may be that the waypoint may be selected in accordance with selection criteria and waypoint descriptions. A waypoint with a waypoint description that satisfies the selection criteria may be selected as the alternate waypoint.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for planning a journey, comprising:
   establishing selection criteria for a journey from an origin to a destination, the selection criteria comprising one or more traveler preferences and one or more rules, a traveler preference describing a desired feature of a waypoint, a rule specifying an action to perform in response to a trigger event, the waypoint representing an intermediate point between the origin and the destination;
   planning a route for the journey from the origin to the destination;
   detecting a trigger event after initiation of the journey, the trigger event independent of user input, the trigger event occurring when at least one of the one or more traveler preferences matches a description related to one or more alternate waypoints;
   accessing a rule of the one or more rules, the accessed rule specifying an action to perform in response to the detected trigger event;
   selecting, after initiation of the journey, at least one of the one or more alternate waypoints in accordance with the action and the selection criteria; and
   inserting the at least one of the one or more alternate waypoints into the route to create a next route.

2. The method of claim 1, wherein:
   the selection criteria comprises a monitored condition of the journey; and
   selecting the at least one of the one or more alternate waypoints in accordance with the action and the selection criteria further comprises:
   establishing the monitored condition; and
   selecting the at least one of the one or more alternate waypoints in accordance with the monitored condition.

3. The method of claim 2, wherein the monitored condition further comprises at least one of a vehicle condition and an external condition.

4. The method of claim 1, wherein inserting the at least one of the one or more alternate waypoints into the route to create the next route further comprises:
   suggesting the at least one of the one or more alternate waypoints; and
   inserting the at least one of the one or more alternate waypoints into the route only if the suggestion is approved.

5. The method of claim 1, wherein inserting the at least one of the one or more alternate waypoints into the route to create the next route further comprises inserting the at least one of the one or more alternate waypoints into the route to create the next route without requesting approval.

6. The method of claim 1, further comprising:
   determining whether the journey comprising the next route is feasible in accordance with the selection criteria; and
   re-planning the route if the journey is not feasible.

7. The method of claim 1, further comprising monitoring, after initiation of the journey, whether a service associated with the at least one of the one or more alternate waypoints has been changed.

8. The method of claim 1, wherein selecting, after initiation of the journey, at least one of the one or more alternate waypoints in accordance with the action and the selection criteria further comprises automatically prioritizing, after initiation of the journey, the one or more alternate waypoints according to compatibility with the selection criteria, a first waypoint that is more compatible with the selection criteria given a higher priority than that of a second waypoint that is less compatible with the selection criteria.

9. A system for planning a journey, comprising:
   a memory operable to store selection criteria for a journey from an origin to a destination, the selection criteria comprising one or more traveler preferences and one or more rules, a traveler preference describing a desired feature of a waypoint, a rule specifying an action to perform in response to a trigger event, the waypoint representing an intermediate point between the origin and the destination; and
   an application module comprising one or more applications operable to:
   plan a route for the journey from the origin to the destination;
   detect a trigger event after initiation of the journey, the trigger event independent of user input, the trigger event occurring when at least one of the one or more traveler preferences matches a description related to one or more alternate waypoints;
   access a rule of the one or more rules, the accessed rule specifying an action to perform in response to the detected trigger event;
   select, after initiation of the journey, at least one of the one or more alternate waypoints in accordance with the action and the selection criteria: and
   insert the at least one of the one or more alternate waypoints into the route to create a next route.

10. The system of claim 9, wherein:
    the selection criteria further comprises a monitored condition of the journey; and
    the one or more applications are further operable to select the at least one of the one or more alternate waypoints in accordance with the action and the selection criteria by:
    establishing the monitored condition; and
    selecting the at least one of the one or more alternate waypoints in accordance with the monitored condition.

11. The system of claim 10, wherein the monitored condition further comprises at least one of a vehicle condition and an external condition.

12. The system of claim 9, the one or more applications are further operable to insert the at least one of the one or more alternate waypoints into the route to create the next route by:
    suggesting the at least one of the one or more alternate waypoints; and
    inserting the at least one of the one or more alternate waypoints into the route only if the suggestion is approved.

13. The system of claim 9, the one or more applications are further operable to insert the at least one of the one or more alternate waypoints into the route to create the next route by inserting the at least one of the one or more alternate waypoints into the route to create the next route without requesting approval.

14. The system of claim 9, the one or more applications are further operable to:
- determine whether the journey comprising the next route is feasible in accordance with the selection criteria; and
- re-plan the route if the journey is not feasible.

15. The system of claim 9, wherein the one or more applications are further operable to monitor, after initiation of the journey, whether a service associated with the at least one of the one or more alternate waypoints has been changed.

16. The system of Claim 9, wherein the one or more applications are further operable to select, after initiation of the journey, at least one of the one or more alternate waypoints in accordance with the action and the selection criteria by automatically prioritizing, after initiation of the journey, the one or more alternate waypoints according to compatibility with the selection criteria, a first waypoint that is more compatible with the selection criteria given a higher priority than that of a second waypoint that is less compatible with the selection criteria.

17. Computer-readable medium encoded with a computer program, the program for planning a journey, and when executed by the computer, the program operable to:
- establish selection criteria for a journey from an origin to a destination, the selection criteria comprising one or more traveler preferences and one or more rules, a traveler preference describing a desired feature of a waypoint, a rule specifying an action to perform in response to a trigger event, the waypoint representing an intermediate point between the origin and the destination;
- plan a route for the journey from the origin to the destination;
- detect a trigger event after initiation of the journey, the trigger event independent of user input, the trigger event occurring when at least one of the one or more traveler preferences matches a description related to one or more alternate waypoints;
- access a rule of the one or more rules, the accessed rule specifying an action to perform in response to the detected trigger event;
- select, after initiation of the journey, at least one of the one or more alternate waypoints in accordance with the action and the selection criteria; and
- insert the at least one of the one or more alternate waypoints into the route to create a next route.

18. The program of claim 17, wherein:
- the selection criteria comprises a monitored condition of the journey; and
- the program is further operable to select the at least one of the one or more alternate waypoints in accordance with the action and the selection criteria by:
  - establishing the monitored condition; and
  - selecting the at least one of the one or more alternate waypoints in accordance with the monitored condition.

19. The program of claim 18, wherein the monitored condition further comprises at least one of a vehicle condition and an external condition.

20. The program of claim 17, further operable to insert the at least one of the one or more alternate waypoints into the route to create the next route by:
- suggesting the at least one of the one or more alternate waypoints; and
- inserting the at least one of the one or more alternate waypoints into the route only if the suggestion is approved.

21. The program of claim 17, further operable to insert the at least one of the one or more alternate waypoints into the route to create the next route by inserting the at least one of the one or more alternate waypoints into the route to create the next route without requesting approval.

22. The program of claim 17, further operable to:
- determine whether the journey comprising the next route is feasible in accordance with the selection criteria; and
- re-plan the route if the journey is not feasible.

23. The program of claim 17, further operable to monitor, after initiation of the journey, whether a service associated with the at least one of the one or more alternate waypoints has been changed.

24. The program of claim 17, further operable to select, after initiation of the journey, at least one of the one or more alternate waypoints in accordance with the action and the selection criteria by automatically prioritizing, after initiation of the journey, the one or more alternate waypoints according to compatibility with the selection criteria, a first waypoint that is more compatible with the selection criteria given a higher priority than that of a second waypoint that is less compatible with the selection criteria.

25. A system for planning a journey, comprising:
- means for establishing selection criteria for a journey from an origin to a destination, the selection criteria comprising one or more traveler preferences and one or more rules, a traveler preference describing a desired feature of a waypoint, a rule specifying an action to perform in response to a trigger event, the waypoint representing an intermediate point between the origin and the destination;
- means for planning a route for the journey from the origin to the destination;
- means for detecting a trigger event after initiation of the journey, the trigger event independent of user input, the trigger event occurring when at least one of the one or more traveler preferences matches a description related to one or more alternate waypoints;
- means for accessing a rule of the one or more rules, the accessed rule specifying an action to perform in response to the detected trigger event;
- means for selecting, after initiation of the journey, at least one of the one or more alternate waypoints in accordance with the action and the selection criteria; and
- means for inserting the at least one of the one or more alternate waypoints into the route to create a next route.

26. A method for planning a journey, comprising:
- establishing selection criteria for a journey from an origin to a destination, the selection criteria comprising one or more traveler preferences, one or more rules, and a monitored condition of the journey, a traveler preference describing a desired feature of a waypoint, a rule specifying an action to perform in response to a trigger event, the waypoint representing an intermediate point between the origin and the destination, the monitored condition comprising at least one of a vehicle condition and an external condition;
- planning a route for the journey from the origin to the destination;
- detecting a trigger event after initiation of the journey, the trigger event independent of user input, the trigger event occurring when at least one of the one or more traveler preferences matches a description related to one or more alternate waypoints;
- accessing a rule of the one or more rules, the accessed rule specifying an action to perform in response to the detected trigger event;
- selecting, after initiation of the journey, at least one of the one or more alternate waypoints in accordance with the action and the selection criteria, the at least one of the one or more alternate waypoints selected by:

establishing the monitored condition;

selecting the at least one of the one or more alternate waypoints in accordance with the monitored condition; and automatically prioritizing, after initiation of the journey, the one or more alternate waypoints according to compatibility with the selection criteria, a first waypoint that is more compatible with the selection criteria given a higher priority than that of a second waypoint that is less compatible with the selection criteria; and inserting the at least one of the one or more alternate waypoints into the route to create a next route by performing at least one of the following:

suggesting the at least one of the one or more alternate waypoints, and inserting the at least one of the one or more alternate waypoints into the route only if the suggestion is approved; and inserting the at least one of the one or more alternate waypoints into the route without requesting approval;

determining whether the journey comprising the next route is feasible in accordance with the selection criteria; and re-planning the route if the journey is not feasible.

* * * * *